Patented July 8, 1952

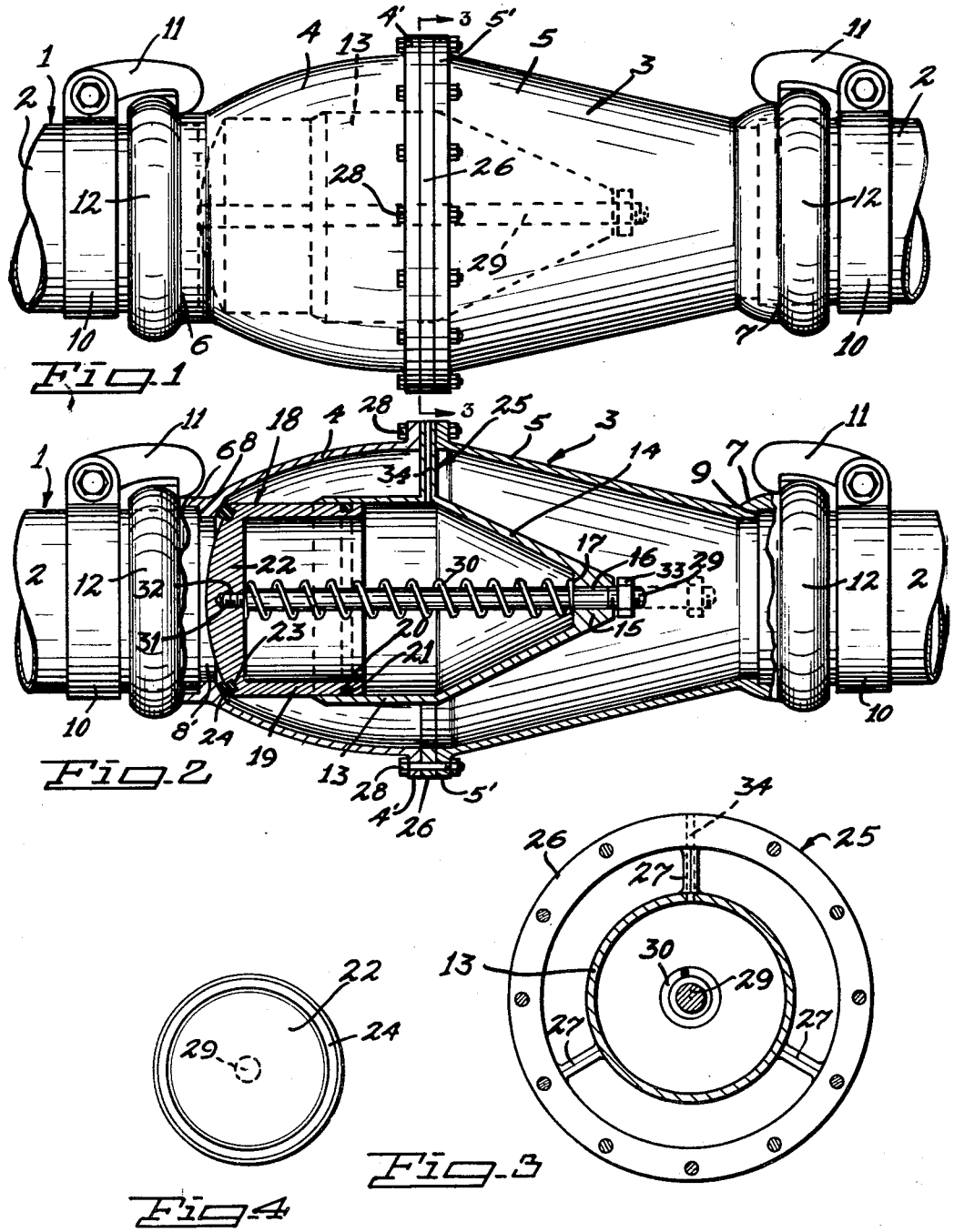

2,602,631

UNITED STATES PATENT OFFICE 2,602,631

CHECK VALVE

Henry C. Eickmeyer, Deer Park, Wash.

Application November 19, 1949, Serial No. 128,450

1 Claim. (Cl. 251—144)

This invention relates to a check valve which is particularly adapted for use in a main pipe of an irrigation system. It will be understood that it may be used wherever found suitable.

In irrigation systems water is pumped from a river or reservoir and in many such systems the pipe leading from the pump extends upwardly from the source of water supply before being connected with distributing pipes leading to sprinklers. When the pump is shut off water in the system drains back through the main pipe and the pump to the source and when the pump is again started it is necessary to fill the main pipe before water can flow from it to the sprinklers. This necessitates considerable pumping and loss of time before water reaches the sprinklers.

Therefore one object of the invention is to provide a check valve which may be interposed in the main pipe and will automatically close when the pump is shut off and serve very effectively to prevent return flow of water through the main pipe and its branch pipes.

Another object of the invention is to provide a check valve of such construction that while it will be held closed when the pump is shut off it may be quickly opened by water pressure during operation of the pump and not appreciably interfere with the flow of water forced through the pipe by the pump.

Another object of the invention is to provide a check valve having a closure consisting of a piston slidable in a cylinder which is supported axially of the valve casing by a spider which serves as a support for the cylinder and also as a gasket for sealing a joint between sections of the casing.

Another object of the invention is to provide the cylinder with a supporting spider having one of its arms formed with a port through which air may flow and thus prevent formation of an air cushion which would interfere with opening movement of the piston.

The invention is illustrated in the accompanying drawings wherein:

Fig. 1 is a side elevation of the improved check valve.

Fig. 2 is a sectional view taken longitudinally through the valve.

Fig. 3 is a transverse sectional view taken along the line 3—3 of Figure 1.

Fig. 4 is a view looking at the outer end of the piston.

This improved check valve is to be installed in a pipe line 1 between pipe sections 2 thereof and has a casing 3 formed of companion sections 4 and 5. These sections taper towards ends of the casing and terminate in necks 6 and 7 in which ends of the pipe sections fit. Ends of the pipe sections fit against shoulders 8 and 9 formed in the necks and in order to firmly hold the pipe sections in the necks there have been provided clamps 10 which are tightly secured about the pipe sections and carry hooks 11 which extend across the beads 12 and grip inner edges thereof. When the hooks are swung away from the beads the casing will be released. Gaskets or equivalent seals may be provided to form water tight joints between the pipe sections and ends of the casing. The two casing sections are of duplicate formation except that the neck of the section 4 is formed with an internal annular flange 8' serving as a seat for an inwardly opening valve member.

Within the casing 3 is a cylinder 13 which extends longitudinally thereof and is open at its outer end. The inner end portion 14 of the cylinder tapers to form a conical portion having its apex inwardly thickened to form a thick tip 15. This tip is formed with a longitudinally extending opening 16 disposed axially of the cylinder surrounded at its inner end by a circumferentially extending shoulder 17. A closure member 18 having the shape of a piston has its annular skirt 19 fitting snugly into the cylinder through the open end thereof and about this skirt is formed a groove 20 in which fits a gasket 21 for forming a tight fit between the skirt and the annular wall of the cylinder. At its outer end the piston has a thick head 22 which is convexed in cross section and formed about its marginal edge with a groove 23 in which fits a gasket 24. The diameter of the piston head is such that the gasket 24 bears against the flange or seat 8' and forms a sealed joint or closure when the valve member 18 is in the closed position.

The cylinder must be held axially of the casing so that the gasket of the valve member will seat proprely against the valve seat and in order to do so there has been provided a spider 25 having a ring 26 and arms 27 extending between the cylinder and the ring radially thereof. Since the arms are spaced from each other circumferentially of the cylinder and the ring water may flow freely through the casing about the cylinder and as the closed end portion of the cylinder is of conical formation flow of water will not be appreciably retarded. The ring 26 of the gasket fits between the flanges 4' and 5' of the casing sections 4 and 5 and is formed with openings registering with openings in the flanges so that bolts 28 may be passed through the flanges and the ring and tightened to firmly secure the spider in place within the casing, the ring of the spider then serving as a gasket for forming a tight joint between the casing sections.

In order to form a tight closure when the piston valve is in its closed position the gasket 24 must be pressed against the valve seat 8' and it is also necessary that this piston be guided in its movement to opened and closed position. In order to accomplish this guided movement of the piston there has been provided a stem 29 and a helical spring 30. The stem has its inner end 31 reduced in diameter and threaded and screwed into a threaded socket 32 formed centrally of the piston head. The outer end portion of the stem slidably passes through the bore or opening 16 of the tip 15 and its protruding end is threaded and carries a nut 33 which limits movement of the piston outwardly of the cylinder and also causes tensioning pressure to be applied to the spring. The spring has one end in abutting engagement with the shoulder 17 and its other end in engagement with the flat inner surface of the piston head and urges the piston towards its closed position against the valve seat. Therefore when a pump which forces water through the pipe from a reservoir or river is shut off the spring will quickly move the piston to its closed position and water cannot run in a reverse direction through the pipe line and through the pump back to the reservoir. The pipe line will thus be always kept full and does not need to be refilled when the pump is again started. Since air in the cylinder would be liable to form a cushion and retard opening movement of the piston a port 34 has been formed through one of the arms 27 and portions of the cylinder and the ring 26 at ends of this arm. This port allows escape of air from the cylinder during opening movement of the piston and also allows air to enter the cylinder during closing of the valve and the valve may quickly move to opened and closed positions.

Having thus described the invention, what is claimed is:

A check valve comprising an elongated casing having front and rear end sections detachably connected with each other, outer ends of said sections being open and adapted for connection with pipe sections and constituting an inlet and an outlet, the inlet being surrounded by an inwardly projecting annular bead constituting a valve seat and also forming a shoulder constituting an abutment for a pipe section, a cylinder in said casing extending longitudinally in concentric relation to walls thereof and having its rear end open, a conical portion on said cylinder and tapering forwardly and terminating in an inwardly thickend tip formed with an axially extending bore, a supporting spider surrounding said cylinder at the rear end of its tapered portion and secured between the connected ends of the casing sections, said spider being formed with a radially extending opening constituting an air vent communicating the atmosphere and said cylinder, a piston having a head and an annular skirt fitting snugly in the cylinder and slidable longitudinally therein between the open rear end of the cylinder and the tapered portion thereof, a gasket about the marginal edge of the head and projecting towards the valve seat, a rod extending from the piston head axially of the skirt and the cylinder and slidably passing through the bore in the tip, and a helical spring about said rod having one end engaging the tip and its other end engaging the piston head and urging the piston out of the cylinder and yieldably holding the gasket in sealing engagement with the valve seat.

HENRY C. EICKMEYER.

REFERENCES CITED

The following references are of record in the file of this patent:

UNITED STATES PATENTS

| Number | Name | Date |
|---|---|---|
| 632,490 | Hemphill | Sept. 5, 1899 |
| 1,292,613 | Kessler | Jan. 28, 1919 |
| 1,537,945 | Hufford | May 19, 1925 |
| 1,802,720 | Junkers | Apr. 28, 1931 |
| 2,192,499 | Larner | Mar. 5, 1940 |